United States Patent
Posniewski et al.

(10) Patent No.: US 6,356,273 B1
(45) Date of Patent: Mar. 12, 2002

(54) METHOD AND SYSTEM FOR PERFORMING MIP MAP LEVEL SELECTION

(75) Inventors: Shannon Posniewski, San Jose; Vadim Kochubievski, Milpitas; Glenn Nissen, Mountain View; Aleksandr Movshovich, Santa Clara; Michael C. Lewis, San Jose, all of CA (US)

(73) Assignee: Broadcom Corporation, Irvine, CA (US)

( * ) Notice: Subject to any disclaimer, the term of this patent is extended or adjusted under 35 U.S.C. 154(b) by 54 days.

(21) Appl. No.: 09/589,604

(22) Filed: Jun. 7, 2000

Related U.S. Application Data

(63) Continuation of application No. 09/326,115, filed on Jun. 4, 1999.

(51) Int. Cl.$^7$ .............................................. G06T 11/40
(52) U.S. Cl. ...................................................... 345/587
(58) Field of Search ................................. 345/582, 586, 345/587

(56) References Cited

U.S. PATENT DOCUMENTS 5,224,208 A * 6/1993 Miller, Jr. et al. .......... 395/125
5,719,599 A * 2/1998 Yang ........................... 395/125

* cited by examiner

*Primary Examiner*—Almis R. Jankus
*Assistant Examiner*—T. F. Cunningham
(74) *Attorney, Agent, or Firm*—Sawyer Law Group LLP

(57) ABSTRACT

A method and system for processing textures for a graphical image on a display is disclosed. The graphical image includes a plurality of polygons. Each of the plurality of polygons includes at least one fragment. The fragment includes at least one texture and a w-value for the fragment. Each polygon has a plurality of vertices, a display area, and a texture space area. Each of the vertices has a vertex w-value. The at least one texture is associated with at least one MIP map. The MIP map includes a plurality of MIP map levels. The method and system include determining a selection value for each fragment of a polygon of the plurality of polygons. The selection value includes ½ multiplied by the base two logarithm of the texture area divided by the display area and divided by the product of the vertex w-values for each of the plurality of vertices. The selection value also includes 3/2 multiplied by the base two logarithm of the w-value for each of the at least one fragment. The selection value also includes a MIP map bias. The method and system also include selecting at least one of the plurality of MIP map levels map for each fragment based on the selection value for each fragment.

22 Claims, 8 Drawing Sheets

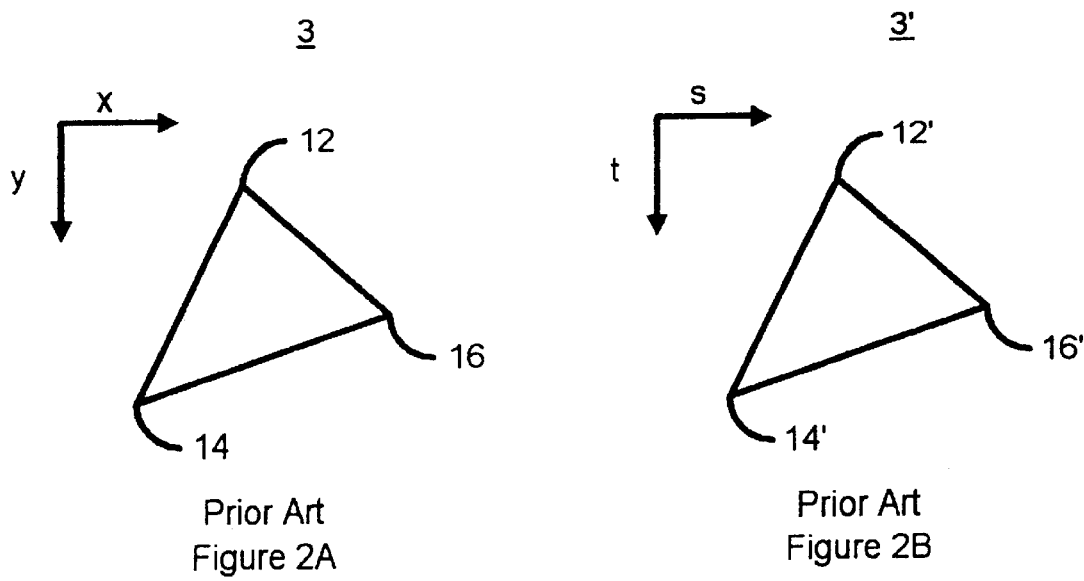
Prior Art
Figure 2A
Prior Art
Figure 2B
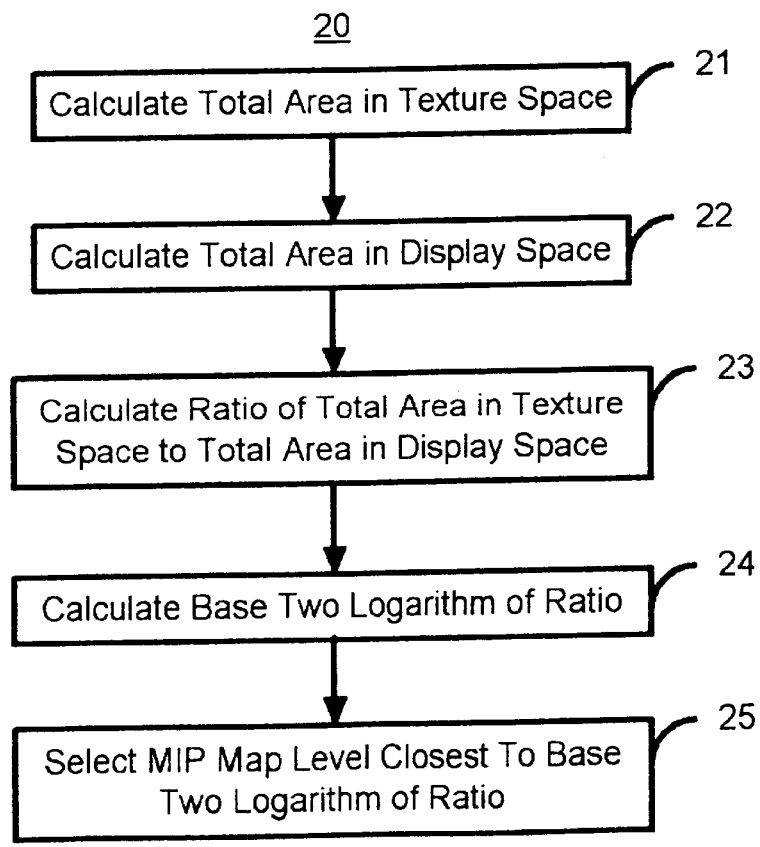
Prior Art
Figure 2C

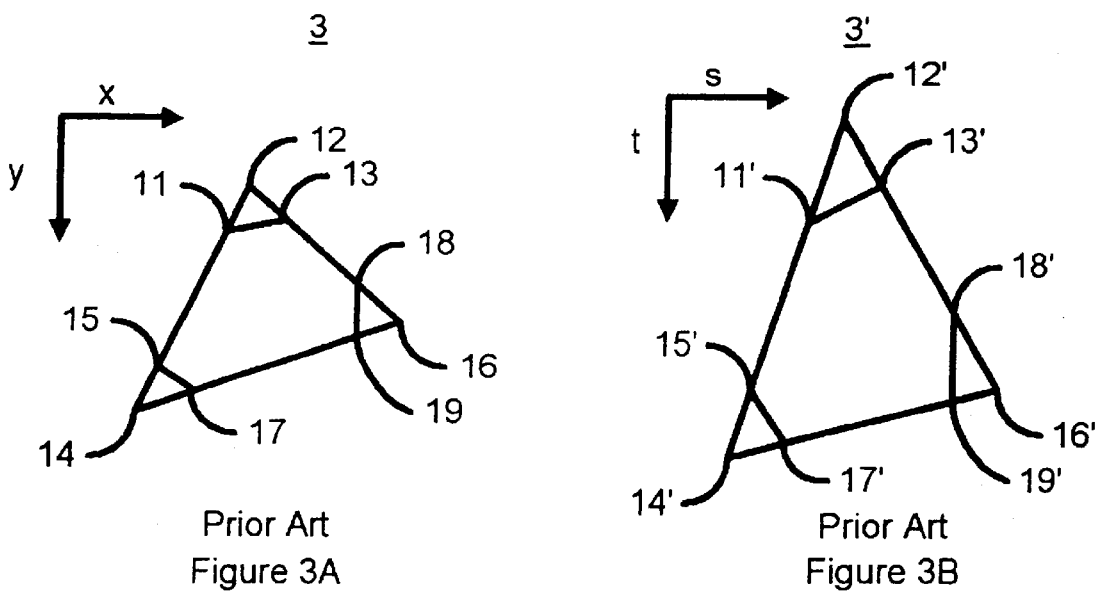
Prior Art
Figure 3A
Prior Art
Figure 3B
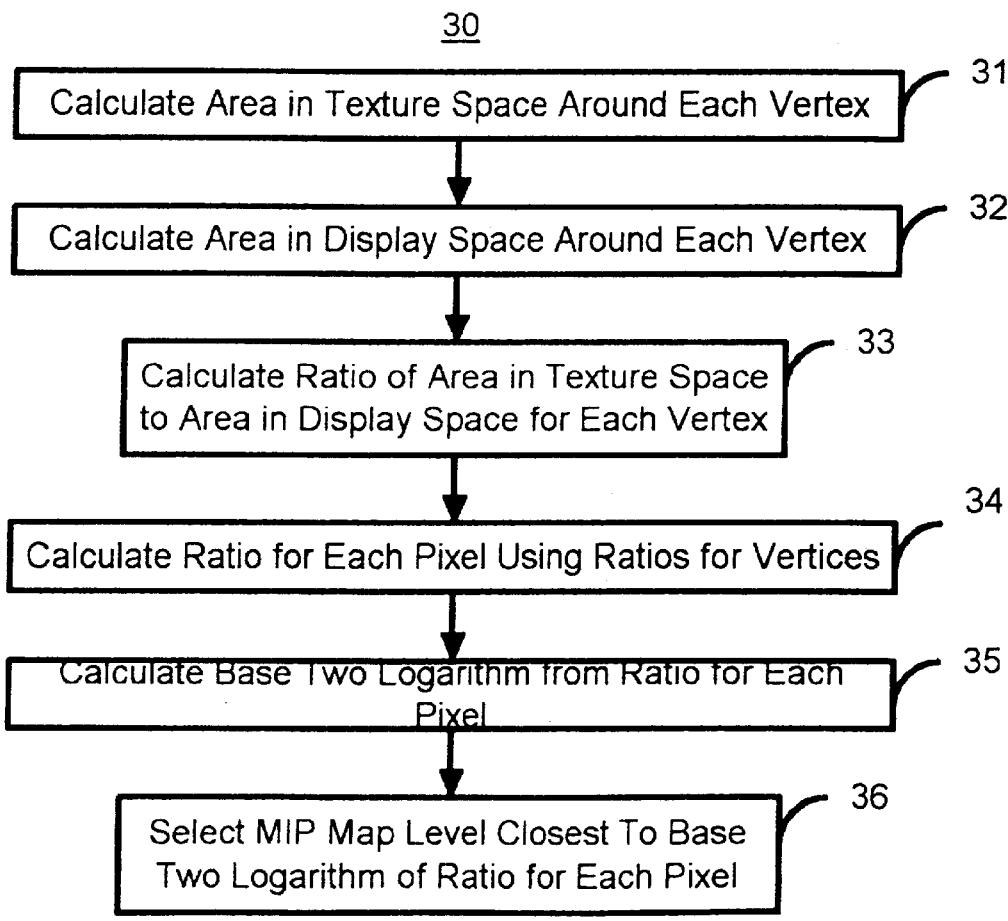
Prior Art
Figure 3C

METHOD AND SYSTEM FOR PERFORMING MIP MAP LEVEL SELECTION this application is a continuation of application Ser. No. 09/326,115 filed Jun. 4, 1999.

FIELD OF THE INVENTION

The present invention relates to graphics processing in a computer system, more particularly to a method and system for selecting a MIP map level when performing texture processing.

BACKGROUND OF THE INVENTION

A conventional computer graphics system can display graphical images of objects on a display. The display includes a plurality of display elements, known as pixels, typically arranged in a grid. In order to display objects, the conventional computer graphics system typically breaks each object into a plurality of polygons. A conventional system then renders the polygons, pixel by pixel, in a particular order.

Each of the polygon covers, or intersects, some number of the pixels in the display. Data for a portion of a polygon which intersects a particular pixel is termed the fragment for that polygon and that pixel. Thus, each polygon typically includes a number of fragments. The fragment includes data relating to the polygon at the pixel the fragment intersects. For example, the fragment typically includes information relating to color, blending modes, and texture. In order to render each fragment of a polygon, a graphics processing system must process the color and texture for the fragment. The texture can be thought of as another color that is typically derived from a texture map. Thus, in most conventional systems, texture from the texture map and color are blended together to obtain a final color value for the fragment.

Although texture mapping generally improves the quality of the image, artifacts may be introduced by texture mapping. For example, aliasing may occur for objects which are far from the viewing plane. Aliasing occurs because polygons which are used to render distant objects are sampled at a lower frequency than the texture. For example, a texture can be considered to be composed of texels, which correspond to pixels. A polygon which is close to the viewing plane typically intersects at least as many pixels as there are texels in the texture. However, a polygon which is far from the viewing plane and, therefore, small, intersects fewer pixels than there are texels in the texture to be mapped to the polygon. When the texture is mapped to the polygon, visual artifacts such as unwanted patterns or flashing can occur.

In order to improve image quality, multum in parvo (MIP) maps are used for texture processing. Using MIP maps for texture mapping, an object's size and distance from the viewing plane can be accounted for. Each MIP map contains data for a texture on several levels. Each level of the MIP map contains data for the texture at a different resolution. For example, the first MIP map level may contain the texture at a first, full resolution. The second MIP map level contains a lower resolution version of the texture. Typically, the second MIP map level is at one-half of the resolution of the first MIP map level. The third MIP map level contains an even lower resolution version of the texture. The third MIP map level is typically at one-fourth the resolution of the first MIP map level. Higher MIP map levels contain lower resolution versions of the texture.

In order to use the MIP map, the appropriate MIP map level(s) for a pixel being rendered are selected. The texture for this MIP map level can then be used in texture mapping for the pixel being rendered. In some conventional methods, the MIP map level is selected using a ratio which depends upon a conventional display area and a conventional texture area. The display area is the area occupied on the display (display space) by a polygon or a portion of a polygon. The conventional texture area is the corresponding area in the texture (texture space). The conventional display area divided by the conventional texture area provides a ratio which is used to select a MIP map level and, in some conventional systems, interpolate between MIP map levels. Because the ratio is used, the MIP map level selected has texels occurring at a frequency close to the frequency at which pixels occur in the region being rendered. As a result, aliasing can be reduced.

Although use of MIP maps improves image quality, artifacts may still occur. Polygons being rendered are often tilted with respect to the viewing plane. In other words, perspective may change the appearance of the objects and the polygons that make up the objects. Because they may be tilted, the projection of the polygon onto the viewing plane (the portion of the polygon that is visible to a viewer) may be compressed in one or more directions. Although some conventional methods take perspective into account, the ability of some of the conventional methods to do so is relatively limited. As a result, the MIP map level selected for some pixels in the polygon may be a poor match for the pixels. Thus, the image quality degrades. Another conventional method for selecting a MIP map level accounts for perspective by determining the maximum compression along the edges of a polygon. However, such a conventional method for selecting a MIP map level is relatively calculation intensive and, therefore, slow.

Accordingly, what is needed is a system and method for selecting a MIP map level which has fewer visible artifacts. It would also be desirable if the method and system do not require a large number of calculations per pixel. The present invention addresses such a need.

SUMMARY OF THE INVENTION

The present invention provides a method and system for processing textures for a graphical image on a display. The graphical image includes a plurality of polygons. Each of the plurality of polygons includes at least one fragment. The fragment includes at least one texture and a w-value for the fragment. Each polygon has a plurality of vertices, a display area, and a texture space area Each of the vertices has a vertex w-value. The at least one texture is associated with at least one MIP map. The MIP map includes a plurality of MIP map levels. The method and system comprise determining a selection value for each fragment of a polygon of the plurality of polygons. The selection value includes ½ multiplied by the base two logarithm of the texture area divided by the display area and divided by the product of the vertex w-values for each of the plurality of vertices. The selection value also includes 3/2 multiplied by the base two logarithm of the w-value for each of the at least one fragment. The selection value also includes a MIP map bias. The method and system also comprise selecting at least one of the plurality of MIP map levels map for each fragment based on the selection value for each fragment.

According to the system and method disclosed herein, the present invention provides a more accurate mechanism for selecting MIP map levels. Consequently, image quality is improved.

BRIEF DESCRIPTION OF THE DRAWINGS

FIG. 2A is a diagram of one triangle in display space as used in a first conventional method for selecting a MIP map level.

FIG. 2B is a diagram of the triangle shown in FIG. 2A in texture space as used in the first conventional method for selecting a MIP map level.

FIG. 2C is a flow chart depicting the first conventional method for selecting a MIP map level.

FIG. 3A is a diagram of one triangle in display space as used in a second conventional method for selecting a MIP map level.

FIG. 3B is a diagram of the triangle shown in FIG. 3A in texture space as used in the second conventional method for selecting a MIP map level.

FIG. 3C is a flow chart depicting the second conventional method for selecting a MIP map level.

DETAILED DESCRIPTION OF THE INVENTION

The present invention relates to an improvement in texture processing for graphics systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1A:
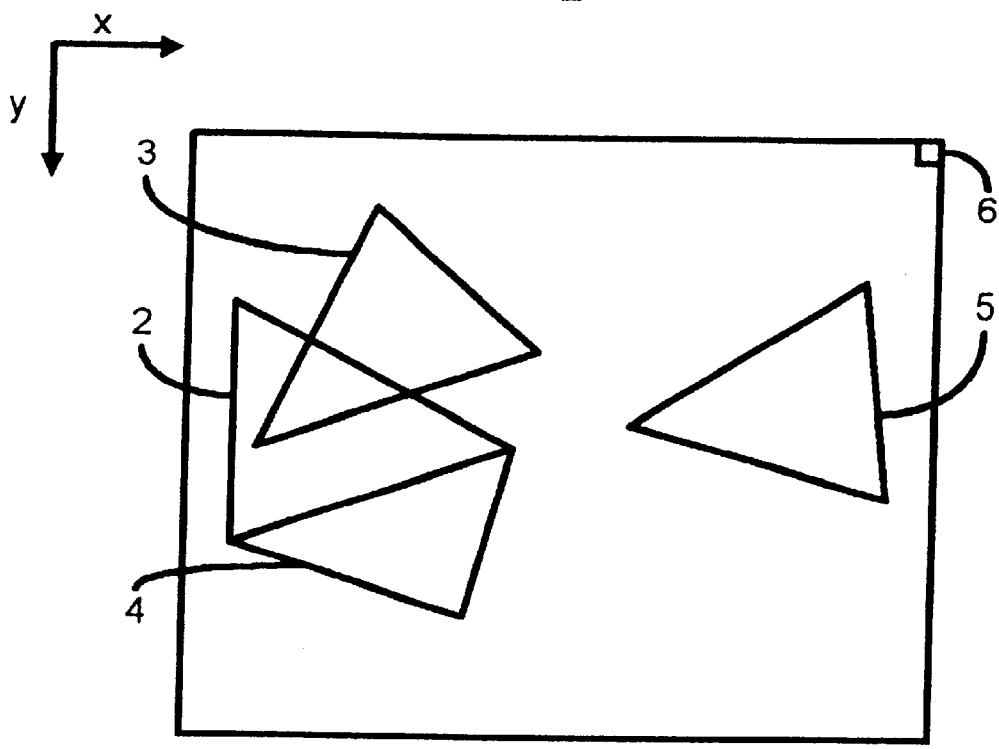
FIG. 1A is a diagram of a graphical display as seen by a viewer.

FIG. 1A is a diagram of a display 1 depicting a graphical image. The display 1 includes a plurality of pixels 6, only one of which is labeled. The graphical image includes polygons 2, 3, 4, and 5, which may be part of an object. A polygon can generally cover any number of pixels and is made up of a corresponding number of fragments. Although each polygon 2, 3, 4, and 5 depicted is a triangle, a polygon could have another shape. Typically, however, triangles are currently used for rendering graphical images. Each of the polygons 2, 3, 4, and 5 covers several pixels and includes a plurality of fragments. Each fragment includes data for a pixel intersected by the corresponding polygon. Thus, a fragment may include data relating to the color, texture, $\alpha$ values, and depth values for a particular polygon 2, 3, 4, or 5 and a particular pixel.

Figure 1B:
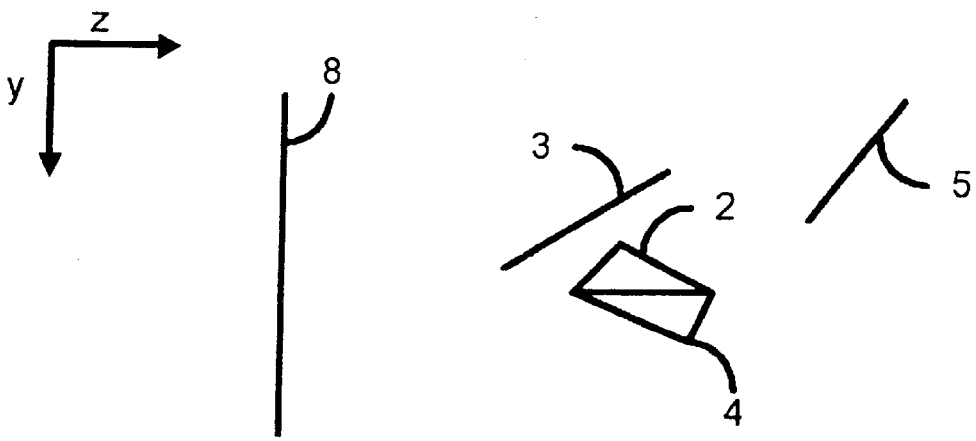
FIG. 1B is a diagram of the graphical display as would be seed from the side.

The graphical image shown on the display 1 is desired to be a three-dimensional image. Thus, FIG. 1B depicts the polygons 2, 3, 4, and 5 as would be seen from the side. The viewing plane 8 is also depicted in FIG. 1B. In FIG. 1A, the polygons 2, 3, 4, and 5 are depicted as seen by a viewer. Thus, the portions of the polygons 2, 3, 4, and 5 depicted in FIG. 1A are the projections of the polygons 2, 3, 4, and 5 onto the viewing plane 8.

Referring to FIGS. 1A and 1B, in order to provide a more realistic graphical image, texture mapping is used when rendering the polygons 2, 3, 4, and 5. Typically, one or more textures are applied to the polygons 2, 3, 4, and 5. If textures are directly applied to the corresponding polygons 2, 3, 4, and 5, visual artifacts such as aliasing may occur. These artifacts occur because the sampling rate of the polygon 2, 3, 4, or 5, which depends on the number of pixels intersected by the polygon 2, 3, 4, or 5, is different from the sampling rate of a full resolution version of the texture, which depends on the number of texels occupied by the texture.

In order to account for aliasing of the polygons 2, 3, 4, and 5, multum in parvo (MIP) maps are used. Each MIP map contains multiple MIP map levels. Each MIP map level contains a version of the texture at a particular resolution. Typically, the lowest (first) MIP map level contains the highest resolution version of the texture. Higher MIP map levels contain versions of the texture having their resolution reduced by a factor of two from the next lower level. For example, the second MIP map level has a one-half resolution version of the texture, while the third MIP map level typically has a one-fourth resolution version of the texture.

Typically, texture mapping is used to provide the texture (s) for rendering a pixel in a polygon 2 3, 4, or 5. When rendering a particular pixel in a particular polygon 2, 3, 4, or 5, the texture(s) indicated by the fragment corresponding to the particular pixel and the particular polygon 2, 3, 4, or 5 are blended with the color for the fragment. In order to provide the textures(s) for a particular pixel in a particular polygon, the MIP map level(s) for the texture(s) are selected. Thus, in order to use the MIP map for texture mapping, at least one MIP map level is selected for each texture.

FIGS. 2A through 2C can be used to illustrate a first conventional method for selecting a MIP map level for use in texture mapping. For ease of explanation, selection of a MIP map level for a fragment corresponding to a pixel intersected by the polygon 3 is discussed. FIGS. 2A and 2B depict the polygon 3 in display space and texture space, respectively. Display space, characterized by x and y axes, is a geometric description of what is viewed by the user. Thus, each vertex 12, 14, and 16 of the polygon 3 has corresponding x and y coordinates $(x_{12}, y_{12})$, $(x_{14}, y_{14})$, and $(x_{16}, y_{16})$, respectively. Thus, FIG. 2A depicts the projection of the polygon 3 onto the viewing plane 8. Referring to FIG. 2B, texture space is the space in a full resolution version of the texture to be mapped. Texture space also corresponds to display space. Thus, the polygon 3' corresponds to the polygon 3. Vertices 12', 14', and 16' correspond to vertices 12, 14, and 16, respectively. Texture space is characterized by s and t axes, which correspond to the x and y axes of display space. Thus, the vertices 12', 14', and 16' have coordinates $(s_{12'}, t_{12'})$, $(s_{14'}, t_{14'})$, and $(s_{16'}, t_{16'})$. Generally, s and t are allowed to vary between zero and one. Thus, to determine the number of texels occupied by a texture, the coordinates on the s and t axes are multiplied by the width and height, respectively, of the texture.

The polygon 3' may differ from the polygon 3 in part because the number of pixels the polygon 3 intersects may be different from the number of texels that the polygon 3' intersects. As discussed above, this may result in undesirable visual artifacts. To account for this, the appropriate MIP map level, or resolution for the texture, is selected. One measure of the appropriate MIP map level to select is the ratio of the number of pixels intersected by the polygon 3 in display space to the number of texels intersected by the corresponding polygon 3' in texture space.

FIG. 2C depicts a conventional method 20 for selecting the MIP map level based on the ratio of the number of texels intersected by the polygon 3' to the number of pixels intersected by the polygon 3. The total area in display space of the polygon 3 is calculated, via step 21. Thus, step 21 includes calculating the quantity:

$$A_{xy}=(x_{14}-x_{12})(y_{16}-y_{12})-(x_{16}-x_{12})(y_{14}-Y_{12})$$

The total area of the polygon 3' in texture space is then calculated, via step 22. Thus, step 22 includes calculating the quantity:

$$A_{st}=[(s_{14'}-s_{12'})(t_{16'}-t_{12'})-(s_{16'}-s_{12'})(t_{14'}-t_{12'})](\text{texture height})(\text{texture width})$$

The ratio of the total area of the polygon 3' in texture space to the total area of the polygon 3 in display space, $R_{conventional\ method1}=A_{st}/A_{xy}$, is then determined, via step 23. The base two logarithm of the ratio, $\log_2(R_1)$, is calculated in step 24. The MIP map level closest to the base two logarithm of the ratio, $\log_2(R_1)$, is then selected, via step 25. Typically, step 25 includes providing a pointer to the desired MIP map level. For example, if the base 2 logarithm of the ratio is zero, the first (highest resolution) MIP map level is selected in step 25. If the base two logarithm of the ratio is 1.3, then the second (next highest resolution) MIP map level is selected in step 25. The method 20 is relatively simple and requires relatively few calculations.

Although the first conventional method 20 functions, one of ordinary skill in the art recognizes that the MIP map level selected is correct for all pixels in a polygon only if the polygon is not tilted in the z-direction. Since the polygon 3 is tilted with respect to the viewing plane, as shown in FIG. 1B, the method 20 depicted in FIG. 2C does not select the best MIP map level for all pixels in the polygon 3. Instead, it selects the average MIP level for all the pixels. Thus, aliasing may occur for a portion of the polygon 3. In addition, to errors in the MIP map level selected for particular pixels of particular polygon, there may be large discontinuities in adjacent polygons, such as the polygons 2 and 4, which should appear similar. Thus, image quality is degraded.

These drawbacks are conventionally addressed by interpolating between MIP map levels. For example, in addition to the selecting the MIP map level in step 25, the fractional portion of the base two logarithm of the ratio can be used to interpolate between MIP map levels, typically using software. Although this improves the match between the MIP map level and the polygon 3, a single MIP map level is still selected for all pixels in the polygon 3. Since the polygon 3 is tilted, the MIP map level selected is still not correct for many pixels in the polygon 3. In addition, discontinuities between adjacent polygons still occur. Thus, image quality is still degraded.

FIGS. 3A through 3C can be used to illustrate a second conventional method for selecting a MIP map level for use in texture mapping. For ease of explanation, selection of a MIP map level for a fragment corresponding to a pixel intersected by the polygon 3 is discussed. FIG. 3A depicts the polygon 3 in display space. FIG. 3B depicts the polygon 3" texture space. FIG. 3C depicts the second conventional method 30 for selecting the MIP map level. Referring to FIGS. 3A, 3B, and 3C, the area in display space of a small portion of the polygon 3 around each of the vertices 12, 14, and 16 is calculated, via step 31. Thus, step 31 includes calculating the quantities:

$$A_{xy,12}=(x_{13}-x_{11})(y_{13}-y_{12})-(x_{13}-x_{11})(y_{12}-y_{11})$$

$$A_{xy,14}=(x_{15}-x_{14})(y_{17}-y_{14})-(x_{17}-x_{14})(y_{15}-y_{14})$$

$$A_{xy,16}=(x_{18}-x_{16})(y_{19}-y_{16})-(x_{19}-x_{16})(y_{18}-y_{16})$$

The perspective correct area of a small portion of the polygon 3' around each of the vertices 12', 14', and 16' in texture space is calculated, via step 32 includes calculating the quantity:

$$A_{st,12'}=(s_{13'}-s_{11'})(t_{13'}-t_{12'})-(s_{13'}-s_{11'})(t_{12'}-t_{11'})(\text{texture height})(\text{texture width})$$

$$A_{st,14'}=(s_{15'}-s_{14'})(t_{17'}-t_{14'})-(s_{17'}-s_{14'})(t_{15'}-t_{14'})(\text{texture height})(\text{texture width})$$

$$A_{st,16'}=(s_{18'}-s_{16'})(t_{19'}-t_{16'})-(s_{19'}-s_{16'})(t_{18'}-t_{16'})(\text{texture height})(\text{texture width})$$

The areas calculated in step 32 are corrected for perspective. For example, if the polygon 3 is tilted in the z direction, as shown in FIGS. 1A and 1B, then the area calculated in step 32 of FIG. 3C may be larger to account for this tilt. Referring to FIGS. 3A, 3B, and 3C, when distances are corrected for perspective, the tilt in the polygon 3 stretches the distance in the t direction for the polygon 3' and changes the value of the texture space area. The ratios of the area near each vertex of the polygon 3' in texture space to the area each vertex of the polygon 3 in display space, $R_{12}=A_{st,12'}/A_{xy,12}$, $R_{14}=A_{st,14'}/A_{xy,14}$, and $R_{16}=A_{st,16'}/A_{xy,16}$ are then determined, via step 33. For each pixel in the polygon 3, a ratio is calculated for selecting the appropriate MIP map level by interpolating between the ratios calculated for each vertex, via step 34. For example, in the region near the vertex 12, the ratio $R_{12}$ may be used as the interpolated ratio. For a pixel between the vertex 12 and the vertex 14, an interpolation between the ratios the vertex 12 and the vertex 14 may be performed to calculate the ratio for the pixel. The base two logarithm, $\log_2(R_{interpolated})$, for each pixel is calculated, via step 35. For each pixel, the MIP map level closest to the base two logarithm of the interpolated ratio, $\log_2(R_{interpolated})$ is then selected, via step 36. In an alternate method, step 36 could include accounting for fractional MIP map levels. In addition, in another method similar to the method 30, the MIP map level could be selected for each vertex, and the MIP map levels interpolated for each pixel. Typically, step 36 includes providing a pointer to the desired MIP map level. The method 30 thus provides a better MIP map level for each pixel than the method 20 because the method 30 accounts for perspective. Furthermore, the method 30 provides an interpolated MIP map level for each pixel, rather than a single MIP map level for all pixels in the polygon.

Although the conventional method 30 provides a MIP map level for each pixel, one of ordinary skill in the art will readily recognize that the conventional method 30 has several drawbacks. The conventional method 30 is an approximation at of the correct MIP map level and may result in inconsistent results for adjacent polygons, such as the polygons 2 and 4. The texture will thus be subject to discontinuities between adjacent polygons. Consequently, image quality is degraded. Furthermore, areas are relatively expensive to calculate, costing time in software calculations and space on a chip for additional hardware if the calculations are in hardware.

Figure 4A:
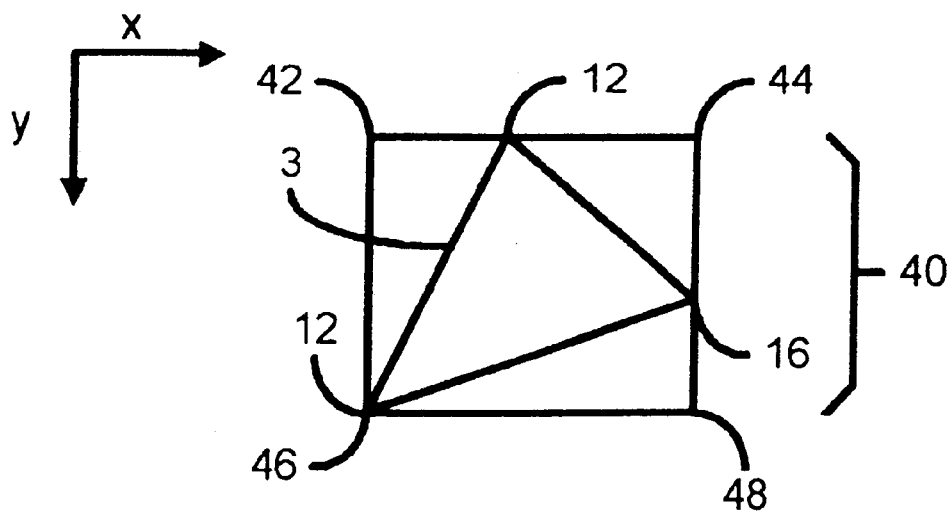
FIG. 4A is a diagram of a triangle in display space as used in a third conventional method for selecting a MIP map level.
Figure 4B:
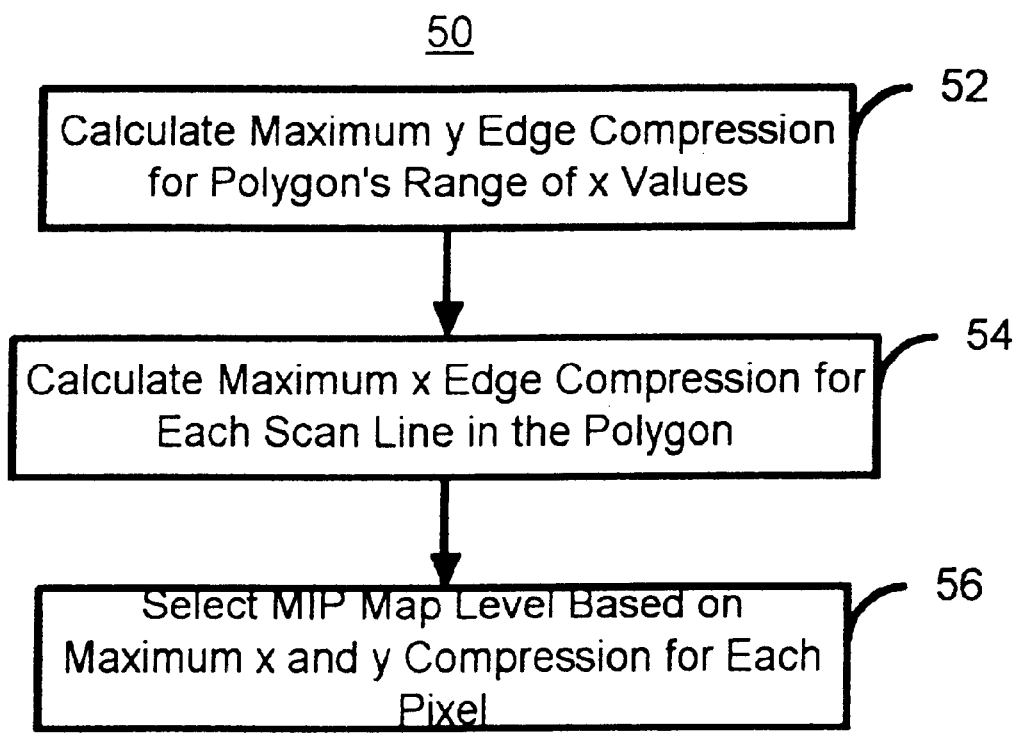
FIG. 4B is a flow chart depicting the third conventional method for selecting a MIP map level.

FIGS. 4A through 4B can be used to illustrate a third conventional method for selecting a MIP map level for use in texture mapping. For ease of explanation, selection of a MIP map level for a fragment corresponding to a pixel intersected by the polygon 3 is discussed. FIG. 4A depicts the polygon 3 in display space. FIG. 4B depicts the third conventional method 50 for performing MIP map selection. In FIG. 4A, the polygon 3 is shown as surrounded as a quadrilateral 40. The top edge of the quadrilateral 40, between corners 42 and 44, represents the top scan line, or top horizontal line of pixels, which intersect the polygon 3. The bottom edge of the quadrilateral 40, between the corners 46 and 48, represents the bottom scan line, or bottom horizontal line of pixels, which intersect the polygon 3. The left and right edges of the quadrilateral 40 are the extreme left and right vertical lines of pixels which intersect the polygon 3.

FIG. 4B depicts the third conventional method 50 for selecting a MIP map level for each pixel in the polygon 3 being rendered. The method 50 utilizes the maximum compression due along edges of the polygon 3 and uses the compression to correct for perspective and select a MIP map level. Thus, the maximum edge compression in the y direction for the polygon's range of x values is calculated, via step 52. The maximum compression in the y direction is given by the square root of the quantity:

$$y_1 = (e-ax)^2 - (f-bx)^2$$

where $e = [dx/(zdy)](1/z_0) - [d(1/z)/dy](s/z_0)$
$a = [ds/((zdx)][d(1/z)dy] - [d(1/z)/dx][ds/(zdy)]$
$f = [dt/(zdy)](1/z_0) - [d(1/z)/dy](t/Z_0)$
$b = [dt/(zdx)][d(1/z)/dy] - [(1/z)/dx][(dt/(zdy)]$ The x, y, s, and t values can be filled in with the appropriate coordinates for the polygon 3. The maximum edge compression in the x direction is then computed for each scan line, via step 54. The maximum compression in the x direction is given by the square root of the quantity:

$$x_1 = (c+ay)^2 - (d+bx)^2$$

where $c = [ds/(zdx)](1/z_0) - [d(1/z)/dx](s/z_0)$
$a = [ds/(zdx)][d(1/z)dy] - [d(1/z)/dx][ds/(zdy)]$
$d = [dt/(zdx)](1/z_0) - [d(1/z)/dx](t/Z_0)$
$b = [dt/(zdx)][d(1/z)/dy] - [(1/z)/dx][(dt/(zdy)]$ The x, y, s, and t values can be filled in with the appropriate coordinates for the polygon 3. The MIP map level is then selected based on the $x_1$ and $Y_1$ values, via step 56.

Although the method 50 selects better MIP map levels and has fewer visual artifacts, one of ordinary skill in the art will realize that the calculations required to select the MIP map levels are complex. Thus, although software could be used to calculate the edge compression values used to select the MIP map level, the selection process would be relatively slow. Furthermore, the compression values still merely provide an estimation of the appropriate MIP map level for each pixel.

The present invention provides a method and system for processing textures for a graphical image on a display. The graphical image includes a plurality of polygons. Each of the plurality of polygons includes at least one fragment. The fragment includes at least one texture and a w-value for the fragment. Each polygon has a plurality of vertices, a display area, and a texture space area. Each of the vertices has a vertex w-value. The at least one texture is associated with at least one MIP map. The MIP map includes a plurality of MIP map levels. The method and system comprise determining a selection value for each fragment of a polygon of the plurality of polygons. The selection value includes ½ multiplied by the base two logarithm of the texture area divided by the display area and divided by the product of the vertex w-values for each of the plurality of vertices. The selection value also includes 3/2 multiplied by the base two logarithm of the w-value for each of the at least one fragment. The selection value also includes a MIP map bias. The method and system also comprise selecting at least one of the plurality of MIP map levels map for each fragment based on the selection value for each fragment.

The present invention will be described in terms of a particular system for performing graphics processing. However, one of ordinary skill in the art will readily recognize that this method and system will operate effectively for other systems having other components. The graphics processing system could also include additional components for other functions. For example, although not depicted, the graphics processing system could perform antialiasing or other functions. Furthermore, the present invention will be described in a system which renders objects pixel by pixel, in raster order. However, one of ordinary skill in the art will readily recognize that the method and system can be used in a system that renders objects in another order. Furthermore, the present invention will be described in the context of performing certain mathematical operations. However, one of ordinary skill in the art will readily realize that the method and system are consistent with use of equivalent mathematical operations.

Figure 5:
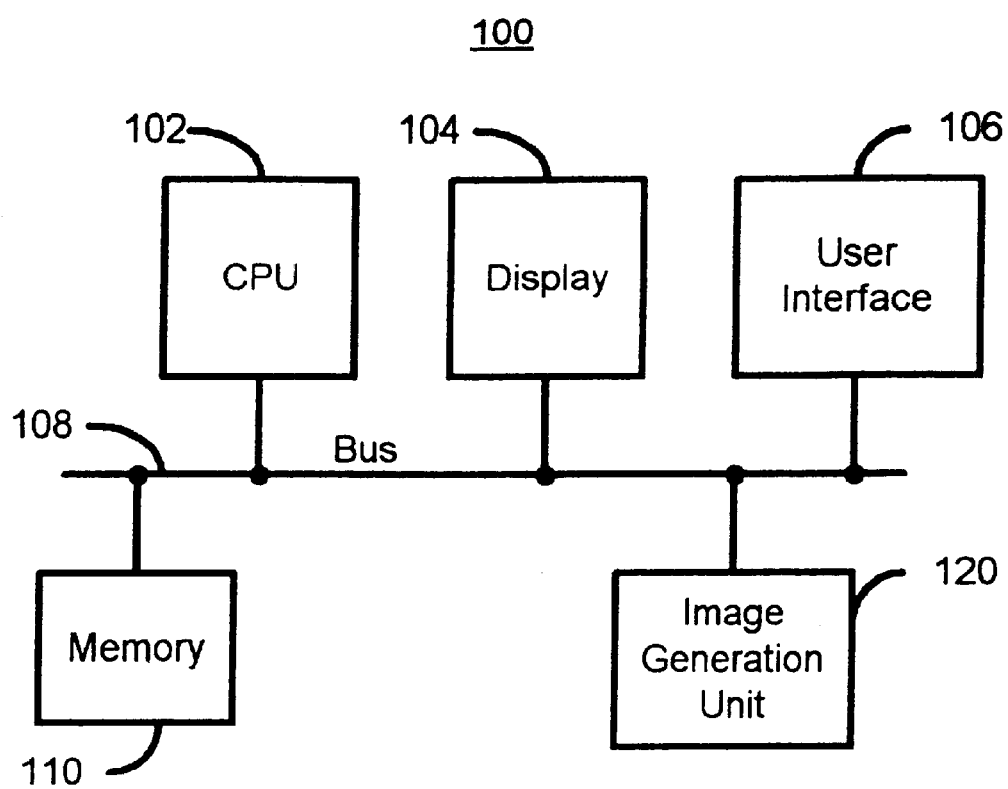
FIG. 5 is a high-level block diagram of a computer system in which a system for providing a graphical image in accordance with the present invention can be implemented.

To more particularly illustrate the method and system in accordance with the present invention, refer now to FIG. 5, depicting one embodiment of a computer system in which a system for providing a graphical image in accordance with the present invention can be implemented. The computer graphics system 100 may be used to generate graphical images for an application, such as an application residing on the memory 110. In particular, the computer graphics system 100 is used to display objects, particularly three-dimensional objects. The computer graphics system 100 includes a central processing unit (CPU) 102, a display 104, a user interface 106 such as a keyboard or mouse or other communicating device, a memory 110, and an image generation unit 120 coupled with a bus 108. The display 104 includes a plurality of pixels, such as the pixels 6 in the display 1. Each of the plurality of pixels has an area. The display 104 could include a display memory (not explicitly shown) to which pixels are written, as well as a screen (not explicitly shown) on which the pixels are displayed to a user. Note, however, that nothing prevents the method and system from being implemented in a different computer system having other components. In a preferred embodiment, each object being displayed is preferably broken into polygons to be used in rendering the objects. In a preferred embodiment, the polygons being rendered are triangles, such as the triangles 2, 3, 4, and 5 of FIG. 1. Referring back to FIG. 5, in a preferred embodiment, the polygons are rendered in raster order, the order of the pixels in the display 104. However, the present invention is consistent with rendering the pixels in another order.

Figure 6:
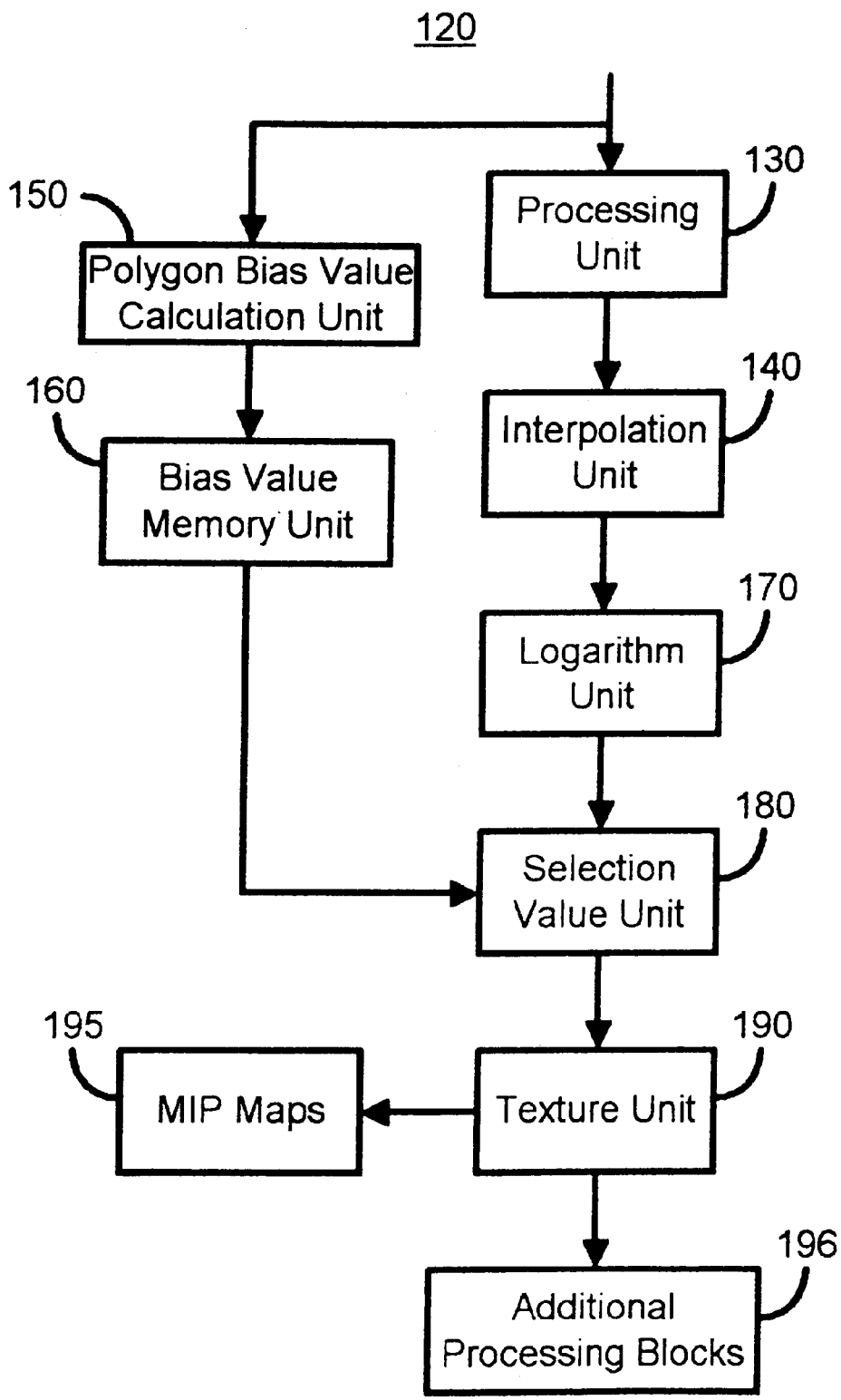
FIG. 6 is a more detailed block diagram of one embodiment of a graphics system in accordance with the present invention.

FIG. 6 depicts relevant portions of the image generation unit 120. The image generation unit 120 includes a processing unit 130, an interpolation unit 140, a polygon bias value calculation unit 160, a bias value memory 160, a logarithm unit 170, a selection value unit 180, a texture unit 190, and MIP maps 195. The image generation unit 120 also includes additional components, generally represented by processing block 196. Thus, although not explicitly depicted, the image generation unit 120 could have other functional unit(s) in addition to or in lieu of the components shown. Furthermore, other units providing similar or additional functions could be used in addition to or in lieu of the processing unit 130 and the interpolation unit 140.

The processing unit 130 identifies data describing portions of polygons ("intersecting polygons") which intersect the area extending along a z-axis from a selected pixel in an x-y plane corresponding to a viewing plane of the display 104. In a preferred embodiment, the intersecting polygons are processed in parallel. The data for with the portion of the intersecting polygon associated with the selected pixel is termed a fragment. In the context of this disclosure, a fragment for an intersecting polygon will be described as intersecting the pixel that the polygon intersects. A fragment may include the color, texture, and depth value for the corresponding polygon. Thus, in a preferred embodiment, each fragment also includes an indication of the polygon of which the fragment is a part. In a preferred embodiment, the processing unit 130 includes multiple processors so that multiple fragments intersecting the same pixel can be processed in parallel.

The interpolation unit 140 can include one or more interpolators. In a preferred embodiment, a single interpolator is used. The interpolation unit 126 receives the fragments interpolates the data for the fragments. In one embodiment, the interpolation unit also calculates the w-value for each pixel. The w-value is proportional to $1/(z+k)$, where k is a constant. Thus, the w-value is a depth value. In a preferred embodiment, the w-value for the fragment is provided by software that provides the data to the image generation unit 120. However, where the w-value is not provided to the image generation unit 120, the interpolation unit 140 preferably calculates the w-value from one over the w-value (1/w), which is generally provided to the image generation unit 120, or from other information.

The polygon bias value calculation unit 150 calculates a bias value, discussed below, for each polygon. The bias value is stored in the bias value memory unit 160, which is preferably a table in a memory on the image generation unit 120. The bias value is later used in selection of the appropriate MIP map. The logarithm unit 170 preferably calculates a constant multiplied by the base two logarithm of the w-value for each fragment. Thus, the logarithm unit 170 preferably performs a look-up to determine the base two logarithm of the w-value for the fragment, then multiplies this value by a constant. The resultant of the logarithm unit 170 is provided to the selection value unit 180. The selection value unit 180 calculates a MIP map selection value for each fragment. To do so the selection value unit 180 also uses the bias value for the polygon corresponding to the fragment. This bias value is stored in the bias value memory unit 160. The selection value calculated by the selection value unit 180, as well as other information for the fragment, is then provided to the texture unit 190. The texture unit 190 utilizes the selection value to determine the appropriate MIP map level to use from the MIP maps 195.

The components which are used in determining values per polygon, such as the polygon bias value calculation unit 150, are preferably separate from the units that perform calculations for each pixel, such as the logarithm unit 170 and the selection value unit 180. As a result, the components which determine values per polygon may take additional clock cycles to perform their calculations without adversely affecting throughput. In a preferred embodiment, the polygon bias value calculation unit 150 may take as many as thirty or more clock cycles without adversely affecting performance. In addition, note that the texture unit 190, the processing unit 130 and, in some embodiments, the interpolation unit 140 may be unaware of the particular mechanism used in calculating the selection value. Thus, the calculation of the selection value can be handled by one or more separate units and the resultant plugged back into the pipeline of the image generation unit 120.

Figure 7:
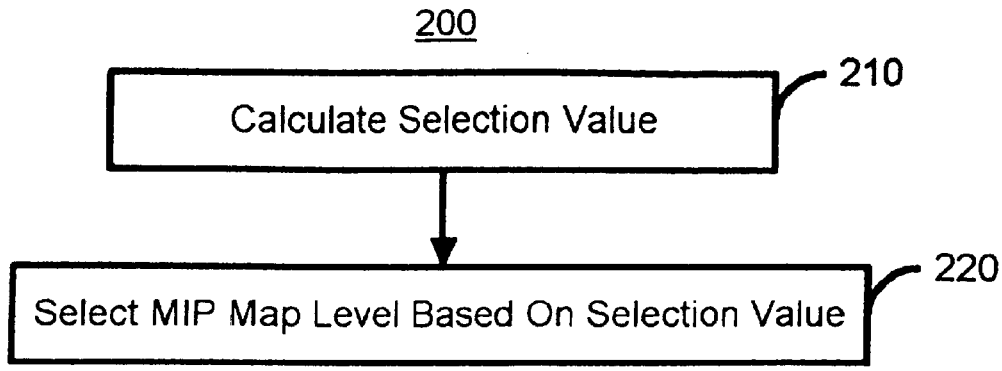
FIG. 7 is a high-level flow chart of one embodiment of a method for selecting a MIP map level in accordance with the present invention.

FIG. 7 depicts a high-level block diagram of one embodiment of a method 200 for selecting MIP map levels in accordance with the present invention. The selection value is calculated, via step 210. The selection value is given by:

selection value=$(½)\log_2[(\text{area}_{st}/\text{area}_{xy})(1/w_0)(1/w_1)(1/w_2)]$+MIPBias+$(3/2)\log_2 w$;

where are $a_{xy}$=area of the polygon in display space
=$abs[(x_1-x_0)(y_2-y_0)-(x_2-x_0)(y_1-y_0)]$;

$(x_0,y_0)$=x and y coordinates of the first vertex of the polygon in display space $(x_1,y_1)$=x and y coordinates of the second vertex of the polygon in display space $(x_2,y_2)$=x and y coordinates of the third vertex of the polygon in display space $\text{area}_{st}$=area of polygon in texture space;
=$abs[(s_1-s_0)(t_2-t_0)-(s_2-s_0)(t_1-t_0)]$(texture height)(texture width) (assuming s and t vary between zero and one)

$(s_0,t_0)$=s and t coordinates of the first vertex of the polygon in texture space $(s_1,t_1)$=s and t coordinates of the second vertex of the polygon in texture space $(s_2,t_2)$=s and t coordinates of the third vertex of the polygon in texture space $w_0$=w-value for first vertex of the polygon;

$w_1$=w-value for second vertex of the polygon;

$w_2$=w-value for third vertex of the polygon;

w=perspective correct interpolated w-value for the pixel being rendered;

0, 1, and 2 denote the three vertices of the polygon; and

MIPbias=a bias value which may be added for a desired visual affect.

Note that the MIPbias may be zero. In a preferred embodiment, the selection value is an eight-bit number. The selection value is then used in selecting one or more MIP map levels, via step 220. In a preferred embodiment, a single MIP map level is selected in step 220. Also in a preferred embodiment, a pointer to the MIP map level is provided in step 220. Step 220 could also include interpolating between MIP map levels, for example to account for fractional selection values.

Figure 8:
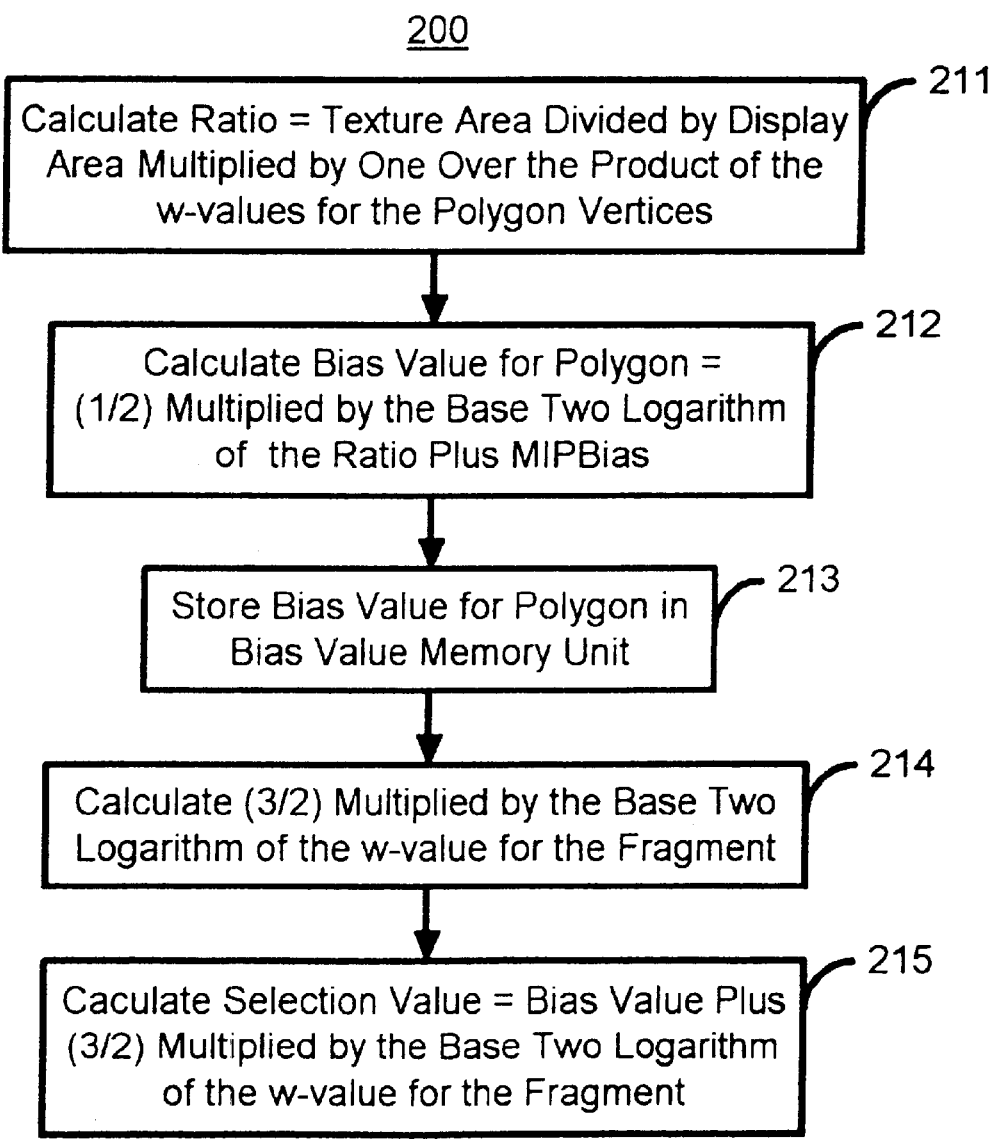
FIG. 8 is a more detailed flow chart of one embodiment of a method for determining a selection value for selecting the MIP map level in accordance with the present invention.

FIG. 8 depicts a more detailed flow-chart of one embodiment of a method for calculating the selection value in step 210. A ratio is calculated for each polygon, via step 211. The ratio calculated in step 211 is the area in texture space divided by the area in display space multiplied by one over the product of the w-values for the vertices of the polygon. Thus, step 211 calculates the quantity:

$$R_{polygon}=(\text{area}_{st}/\text{area}_{xy})(1/w_0)(1/w_1)(1/w_2)$$

Preferably, step 211 is performed by the polygon bias value calculation unit 150. The bias value for the polygon is then calculated, via step 212. Preferably, step 212 is also performed by the bias value calculation unit 150. Thus, step 212 calculates the quantity:

$$\text{bias value} = (\tfrac{1}{2})\log_2(R_{polygon}) + \text{MIPBias}$$
$$= (\tfrac{1}{2})\log_2[(\text{area}_{st}/\text{area}_{xy})(1/w_0)(1/w_1)(1/w_2)] + \text{MIPBias}$$

Thus, steps 211 and 212 calculate a bias value that does not change for any of the fragments which correspond to the same polygon. As discussed above, steps 211 and 212 are both performed by the polygon bias value calculation unit 150. Because steps 211 and 212 can be performed separately from calculations relating to individual fragments, steps 211 and 212 can take many clock cycles to complete without adversely affecting throughput and, therefore, performance. A latency for the first pixel processed in an image may, however, be introduced. The bias value for the polygon is then stored in the bias value memory unit 160, via step 213. A constant multiplied by the base two logarithm of the w-value is then determined, via step 214. Step 214 is preferably performed by the logarithm unit 170. Thus, step 214 preferably includes calculating the quantity $(3/2)\log_2 w$. The selection value for each value is then determined, via step 215. Thus, step 215 includes determining the quantity:

$$\text{selection value} = \text{bias value} + (3/2)\log_2 w$$

Step 215 is preferably performed by the selection value unit 180. Preferably, the selection value unit 180 calculates the selection value in step 215 by obtaining bias value from the bias value memory unit 160 and $(3/2)\log_2 w$ from the logarithm unit 170. In a preferred embodiment, the selection value is an eight-bit number.

Figure 9:
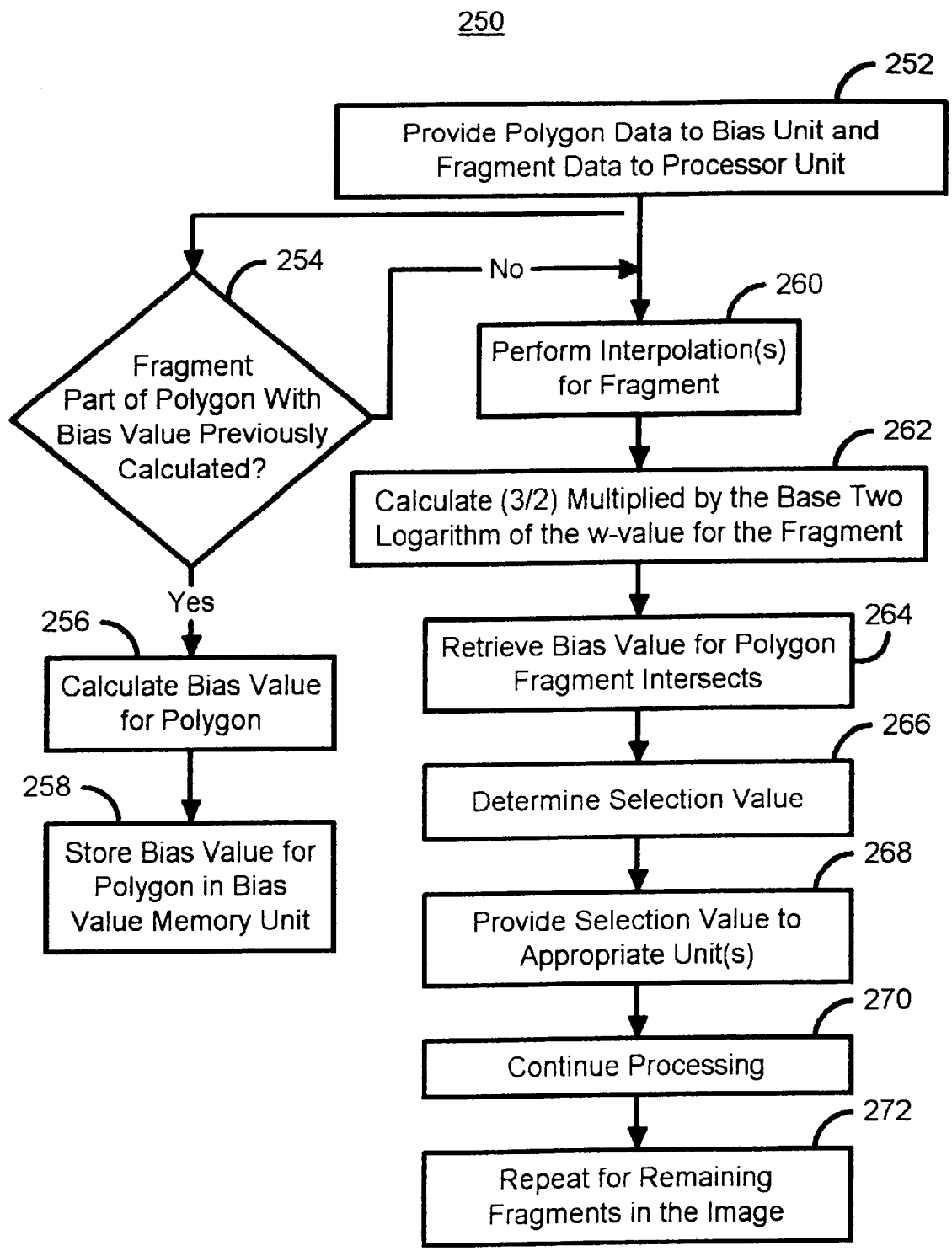
FIG. 9 is a more detailed flow chart of one embodiment of a method for rendering a graphical image in accordance with the present invention.

FIG. 9 depicts a more detailed flow chart of a method 250 selecting a MIP map level in accordance with the present invention. FIG. 9 will be discussed in conjunction with the embodiment of the image generation unit 120 depicted in FIG. 6. For a particular fragment in the image generation unit, the data relating to the polygon is provided to the polygon bias value calculation unit 150, while the data in the fragment specific to a pixel is provided to the processing unit 130, via step 252. Also in step 252 information indicating the polygon to which the fragment corresponds is provided to the polygon bias value calculation unit 150 and the processing unit 130. It is determined, via step 254 if the fragment is part of a polygon which has not had its bias value previously calculated. In one embodiment, step 254 is performed by the polygon bias value calculation unit 150. If not, then step 260, discussed below, is performed. If the bias value has not been calculated for the polygon, then the bias value is calculated, via step 256. Step 256 is preferably performed by the polygon bias value calculation unit 150. The bias value for the polygon is then stored in the bias value store unit 160, via step 258. Because steps 254 through 256 may be performed in parallel with calculations for individual fragments, steps 254 through 256 may take multiple clock cycles to complete without adversely affecting performance.

Data for the individual fragment is processed and interpolated, via step 260. (3/2) multiplied by the base two logarithm of the w-value for the fragment is then calculated, via step 262. Step 262 is preferably performed by the logarithm unit 170. The bias value for the polygon to which the fragment corresponds is retrieved, via step 264. The selection value for the fragment is then determined, via step 266. Step 266 is preferably performed by the selection value unit 180 and includes adding the bias value to (3/2) multiplied by the base two logarithm of the w-value for the fragment. In a preferred embodiment, the selection value is an eight-bit number. The selection value is then provided to the appropriate unit, via step 268. Preferably, step 268 includes providing the selection value to the texture unit 190. Processing is continued, via step 270. Step 270 preferably includes selecting the appropriate MIP map level from the MIP maps 195, interpolating between MIP map levels if desired, blending and other operations to provide the graphical image. The method 250 is then repeated for remaining fragments in the graphical image being rendered, via step 272.

The methods 200, 210, and 250 provide a selection level which is calculated for each fragment and each pixel in a polygon. Thus, the selection level can vary over the polygon. The selection level provided by the methods 200, 210, and 250 is essentially the instantaneous selection level that is correct for each fragment. In other words, the methods 200, 210, and 250 can be viewed as providing the instantaneous ratio of texture space area to screen space area for each fragment. Thus, approximations due to the method of calculation for the selection level, such as using the total area of the polygon, introduce little or no error into the calculation of the selection level. Rounding and other mathematical errors may, however, be introduced. Because the selection level is correct for each pixel, fewer visual artifacts may be introduced in choosing the MIP map level. Thus, aliasing is reduced. Furthermore, because the selection level is correct and varies pixel by pixel, discontinuities between adjacent polygons are reduced or eliminated. In addition, the calculations required are relatively simple. Thus, time or hardware space consumed in implementing the methods 200, 210, or 250 may be reduced. Furthermore, when utilizing a system, such as the system 120, calculations for the bias value, which remain the same for all fragments in a polygon, are separated from calculations which vary fragment by fragment (pixel by pixel). In other words, the bias value is calculated only once per polygon, rather than once for each pixel. Thus, more clock cycles are allowed for calculating the bias value. This facilitates performance of the method 200, 210, or 250 without adversely affecting throughput and, therefore, performance of the system 120. Thus, image quality is improved, preferably without significant sacrifices in time or chip area used to generate the image.

Furthermore, the selection level calculated using the method of 200, 210, or 250 can be used in determining other information which may be useful in improving image quality. For example, the selection level can be used in performing anisotropic filtering or in determining a perspective correction, such as ds/dx or dt/dy.

For example, interpolation of a variable that varies with x, such as a, generally takes the form:

$$a = (a_1 - a_0) * q(x) + a_0$$

where $0.0 \leq q(x) \leq 1.0$ a depends at least on x $a_1$ = value of a at the first point used in interpolation $a_2$ = value of a at the second point used in interpolation For perspective correct interpolation, the perspective correcting function $q_p(x)$ is used to interpolate a. This perspective correcting function is given by:

$$q_p(x) = w_0 * (x - x_0) / [w_0 * (x - x_0) + w_1 * (x_1 - x)]$$

Thus, the perspective correct change in a quantity with respect to x can be expressed as:

$$\frac{da}{dx} = (a_L - a_R) * D(x)$$

where:

$D(x) = w_0 w_1 (x_1 - x_0)/(AplusB)^2$ $AplusB = w_0(x - x_0) + w_1(x_1 - x)$ $a_L$=the value of a at the left edge of the polygon at the same y-value as the point being interpolated $a_R$=the value of a at the right edge of the polygon at the same y-value as the point being interpolated Thus, da/dx can be calculated relatively easily. Furthermore, the selection value is a measure of the perspective correct average change in a quantity for the x and y directions. Thus, using da/dx, calculated above, and the selection value, the quantity da/dy can be calculated. The quantities da/dx and da/dy can be used in other operations that may improve image quality, such as anisotropic filtering.

A method and system has been disclosed for selecting a MIP map level. The method results in improved image quality, preferably without unduly sacrificing space or performance. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for processing textures for a graphical image on a display, the graphical image including a plurality of polygons, each of the plurality of polygons including at least one fragment, the at least one fragment including at least one texture and a w-value for the fragment, each of the plurality of polygons having a plurality of vertices, a display area, and a texture space area, each of the plurality of vertices having a vertex w-value, the at least one texture being associated with at least on multum in parvo (MIP) map, the MIP map including a plurality of MIP map levels, the method comprising the steps of:

(a) determining a selection value for each of the at least one fragment of a polygon of the plurality of polygons, the selection value including ½ multiplied by the base two logarithm of the texture area divided by the display area and divided by the product of the vertex w-values for each of the plurality of vertices, the selection value also including 3/2 multiplied by the base two logarithm of the w-value for each of the at least one fragment, the selection value also including a MIP map bias level; and (b) selecting at least one of the plurality of MIP map levels map for each of the at least one fragment based on the selection value for each of the at least one fragment.

2. The method of claim 1 wherein the selection value determining step (a) further includes the steps of:

(a1) calculating a ratio value for a polygon of the plurality of polygons, the ratio value being the texture area divided by the display area and multiplied by one over the product of the vertex w-value for each of the plurality of vertices;

(a2) calculating a bias value for the polygon, the bias value being a MIP map bias level added to a quantity including ½ multiplied by the base two logarithm of the ratio value for the polygon; and (a3) determining the selection value for each of the at least one fragment of the polygon, the selection value being the bias value for the polygon added to 3/2 multiplied by the base two logarithm of the w-value for each of the at least one fragment.

3. The method of claim 1 further comprising the step of:

(c) interpolating between the at least one of the plurality of MIP map levels selected in step (b) and another level of the plurality of MIP map levels if the selection value is fractional.

4. The method of claim 3 wherein interpolating step (c) further includes the steps of:

(c1) selecting a first MIP map level of the plurality of MIP map levels based on a greatest whole number less than the selection level; and (c2) interpolating between the first MIP map level and a second MIP map level based on the difference between the selection level and the greatest whole number less than the selection level.

5. The method of claim 1 further comprising the step of:

(c) repeating steps (a) and (b) for remaining polygons of the plurality of polygons.

6. The method of claim 1 wherein the MIP map bias level is zero.

7. The method of claim 1 wherein the display is characterized by a plurality of x coordinates and a plurality of y coordinates, wherein a particular polygon of the plurality of polygons has a quantity associated with it, the quantity capable of depending on an x coordinate of the plurality of x coordinates and the y coordinate of the plurality of y coordinates, and wherein the method further comprises the step of:

(c) calculating a first perspective correct change in the quantity versus the x coordinate;

(d) calculating a second perspective correct change in the quantity versus the y coordinate based on the first perspective correct change in the quantity and the selection value; and (e) using the first perspective correct change in the quantity and the second perspective correct change in the quantity to improve an image quality of the graphical image.

8. A computer-readable medium containing a program for processing textures for a graphical image on a display, the graphical image including a plurality of polygons, each of the plurality of polygons including at least one fragment, the at least one fragment including at least one texture and a w-value for the fragment, each of the plurality of polygons having a plurality of vertices, a display area, and a texture space area, each of the plurality of vertices having a vertex w-value, the at least one texture being associated with at least on multum in parvo (MIP) map, the MIP map including a plurality of MIP map levels, the program including instructions for:

(a) determining a selection value for each of the at least one fragment of a polygon of the plurality of polygons, the selection value including ½ multiplied by the base two logarithm of the texture area divided by the display area and divided by the product of the vertex w-values for each of the plurality of vertices, the selection value also including 3/2 multiplied by the base two logarithm of the w-value for each of the at least one fragment, the selection value also including a MIP map bias level; and (b) selecting at least one of the plurality of MIP map levels map for each of the at least one fragment based on the selection value for each of the at least one fragment.

9. The computer-readable medium of claim 8 wherein the selection value determining instructions (a) further includes instructions for:
 (a1) calculating a ratio value for a polygon of the plurality of polygons, the ratio value being the texture area divided by the display area and multiplied by one over the product of the vertex w-value for each of the plurality of vertices;
 (a2) calculating a bias value for the polygon, the bias value being a MIP map bias level added to a quantity including ½ multiplied by the base two logarithm of the ratio value for the polygon; and
 (a3) determining the selection value for each of the at least one fragment of the polygon, the selection value being the bias value for the polygon added to 3/2 multiplied by the base two logarithm of the w-value for each of the at least one fragment.

10. The computer-readable medium of claim 8 wherein the program further includes instructions for:
 (c) interpolating between the at least one of the plurality of MIP map levels selected in step (b) and another level of the plurality of MIP map levels if the selection value is fractional.

11. The computer-readable medium of claim 10 wherein instructions for interpolating (c) further includes instructions for:
 (c1) selecting a first MIP map level of the plurality of MIP map levels based on a greatest whole number less than the selection level; and
 (c2) interpolating between the first MIP map level and a second MIP map level based on the difference between the selection level and the greatest whole number less than the selection level.

12. The computer-readable medium of claim 8 wherein the program further includes instructions for:
 (c) repeating steps (a) and (b) for remaining polygons of the plurality of polygons.

13. The computer-readable medium of claim 8 wherein the MIP map bias level is zero.

14. The computer-readable medium of claim 8 wherein the display is characterized by a plurality of x coordinates and a plurality of y coordinates, wherein a particular polygon of the plurality of polygons has a quantity associated with it, the quantity capable of depending on an x coordinate of the plurality of x coordinates and the y coordinate of the plurality of y coordinates, and wherein the program further includes instructions for:
 (c) calculating a first perspective correct change in the quantity versus the x coordinate;
 (d) calculating a second perspective correct change in the quantity versus the y coordinate based on the first perspective correct change in the quantity and the selection value; and
 (e) using the first perspective correct change in the quantity and the second perspective correct change in the quantity to improve an image quality of the graphical image.

15. A system for processing textures for a graphical image on a display, the graphical image including a plurality of polygons, each of the plurality of polygons including at least one fragment, the at least one fragment including at least one texture and a w-value for the fragment, each of the plurality of polygons having a plurality of vertices, a display area, and a texture space area, each of the plurality of vertices having a vertex w-value, the system comprising:
 at least one multum in parvo (MIP) map associated with the at least one texture, the MIP map including a plurality of MIP map levels;
 a bias value unit for calculating a bias value for each of the plurality of polygons, the bias value being a MIP map bias level added to a quantity including ½ multiplied by the base two logarithm of a ratio value for the polygon, the ratio value being the texture area divided by the display area and multiplied by one over the product of the vertex w-value for each of the plurality of vertices;
 at least one interpolator for providing information relating to each of the plurality of fragments;
 a logarithm unit coupled with the at least one interpolator for determining a base two logarithm of the w-value for each of the at least one fragment;
 a selection value unit coupled with the logarithm unit and the bias value calculation unit, for determining a selection value for each of the at least one texture for each of the at least one fragment, the selection value being the bias value for a polygon corresponding to the each of the at least one fragment added to 3/2 multiplied by the base two logarithm of the w-value for each of the at least one fragments;
 a texture unit for selecting at least one of the plurality of MIP map levels map for each of the at least one fragment based on the selection value for each of the at least one fragment.

16. The system of claim 15 further comprising:
 means coupled with the bias value unit for storing the bias value for each of the plurality of a portion of the polygons; and
 wherein the selection value unit is coupled with the bias value calculation means through the storing means.

17. The system of claim 15 wherein the interpolator further calculates the w-value for each of the plurality of fragments.

18. The system of claim 15 wherein the bias value unit consumes a plurality of clock cycles for calculating a bias value for each of the plurality of polygons.

19. The system of claim 15 wherein the selection value unit provides a particular selection value a particular fragment of the at least one fragment each clock cycle.

20. The system of claim 15 wherein the texture unit further interpolates between the at least one of the plurality of MIP map levels selected and another level of the plurality of MIP map levels if the selection value is fractional.

21. The system of claim 20 wherein texture unit further selects a first MIP map level of the plurality of MIP map levels based on a greatest whole number less than the selection level; and
 interpolates between the first MIP map level and a second MIP map level based on the difference between the selection level and the greatest whole number less than the selection level.

22. The system of claim 15 wherein the MIP map bias level is zero.

* * * * *